Oct. 9, 1934.   G. H. ARBENZ   1,975,760
DISHWASHER
Filed April 1, 1932   2 Sheets-Sheet 2
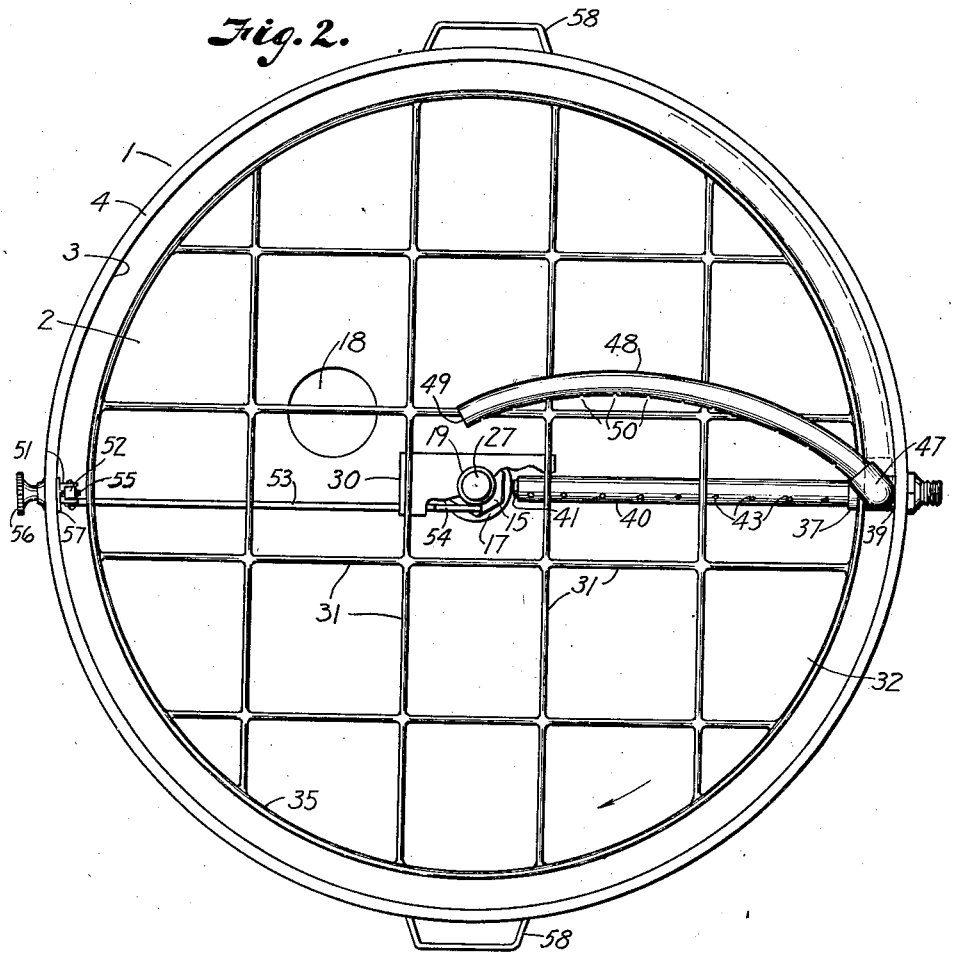
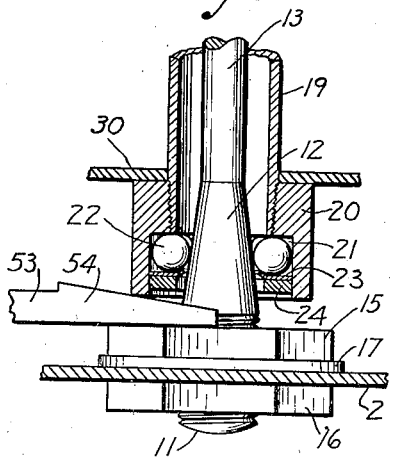
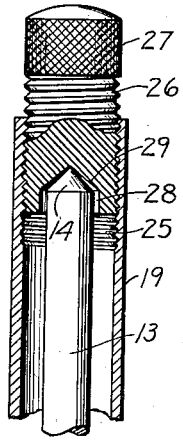
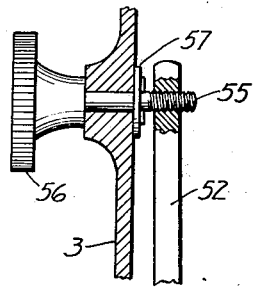
INVENTOR.
George H. Arbenz
BY *Arthur C. Brown*
ATTORNEY.

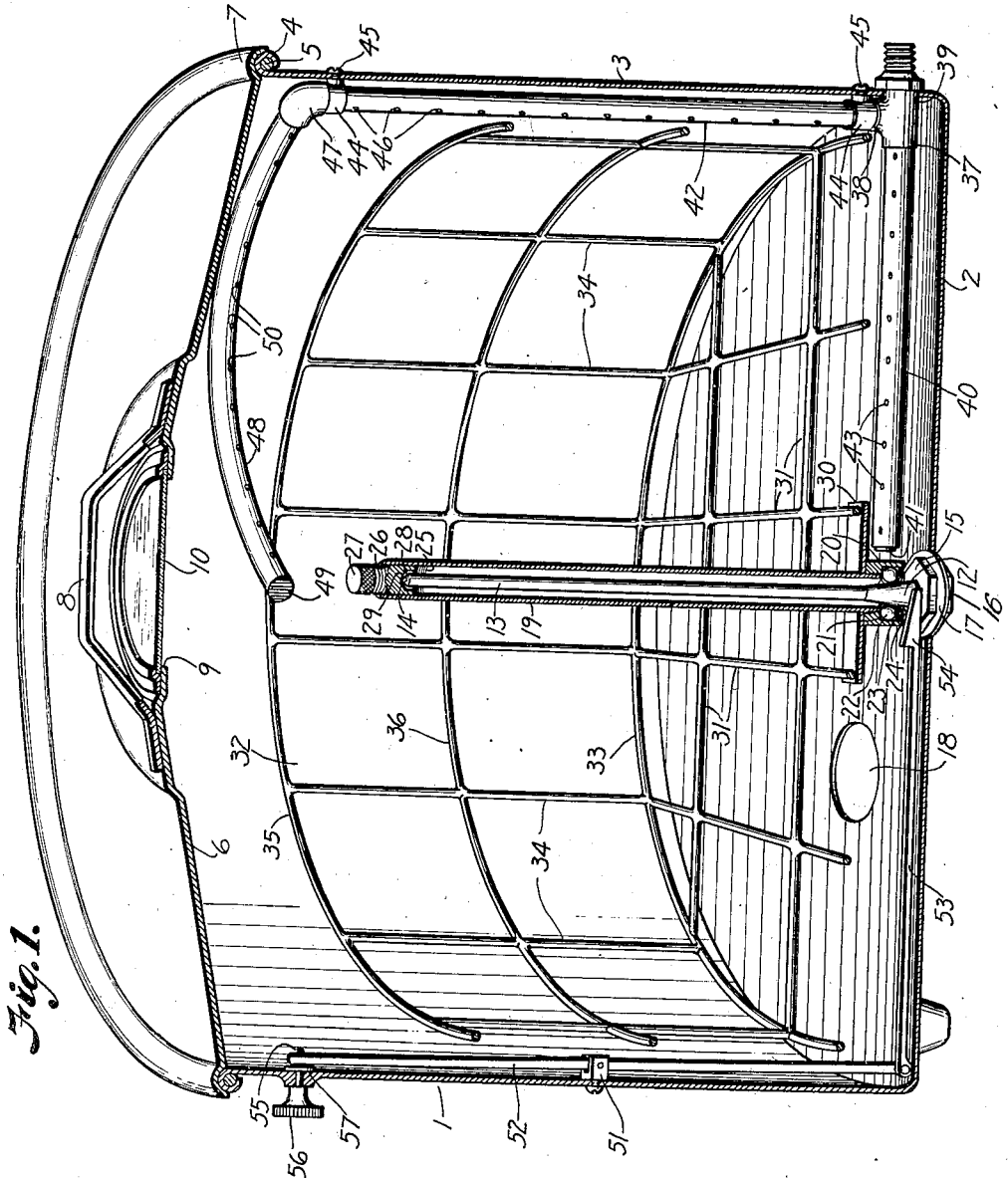

Patented Oct. 9, 1934

1,975,760

UNITED STATES PATENT OFFICE 1,975,760

DISHWASHER

George H. Arbenz, Kansas City, Kans., assignor to H. M. McQueen, Kansas City, Mo.

Application April 1, 1932, Serial No. 602,494

1 Claim. (Cl. 308—230)

This invention relates to dish washers, and more particularly to a portable type for household use.

The device is intended to be placed on the drain board of a kitchen sink, or in the sink itself, and be attached to one of the water faucets, and is so arranged that water will strike dishes therein from three directions simultaneously.

An important feature of my device is a rotary basket which is rotated by sprays of water impacting dishes therein, the speed of rotation of the basket being controlled from without the washer so that a portion of the force of the spray can be utilized in removing food particles etc. from the dishes.

The device may also be used for washing vegetables, especially such as spinach, kale and the like.

Another important feature is that the basket can be easily removed so that the casing can be thoroughly cleaned after use.

In accomplishing these and other objects of the invention, I have provided improved details of structure, the preferred forms of which are illustrated in the accompanying drawings, wherein:

Fig. 1 is a vertical perspective section of my device.

Fig. 2 is a top plan view of the same with the cover removed.

Fig. 3 is an enlarged fragmental vertical section of the lower end of the basket support and brake.

Fig. 4 is a similar view of the upper end of the basket support.

Fig. 5 is an enlarged fragmental view with parts in section, showing the brake operating means.

Referring to the drawings in detail:

1 indicates generally a casing consisting of a cylindrical container having a bottom 2 and a wall 3 which is preferably rolled or beaded at its top, as indicated by the numeral 4, for stiffening the upper edge of the container, and this edge may be further reinforced by means of a ring 5 placed in the rolled or beaded edge 4.

A lid or cover 6 is provided for the container which has a seat 7 formed adjacent its edge for the purpose of engaging the edge 4 of the container and preventing accidental shifting of the lid while the device is in operation. The lid 6 is further provided with a handle 8 and with an opening 9 over which a transparent member 10 is placed, forming a window through which the operation of the washer can be observed as to speed of rotation of the basket and the condition of the dishes being washed without removing the cover.

Formed centrally through the bottom 2 is an opening through which the threaded end 11 of a rod forming the basket support extends. Immediately above the threaded end 11 is a tapered portion 12 which merges into a reduced cylindrical portion 13 having a conical tip 14 at its upper end.

Nuts 15 and 16 are carried by the threaded end 11 and are located on opposite sides of the bottom 2, and, when tightened against the bottom, hold the rod upright. A washer or gasket 17 is preferably placed below the nut 15 so as to make a water tight connection. A drain opening 18 is also formed through the bottom 2 and, if desired, a stopper may be furnished to close this opening.

Surrounding the rod is a tubular member 19 having a housing 20 secured to its lower end. The housing has a circular recess 21 formed in its lower end forming a race for the bearing balls 22 which are retained in the race by means of a retaining washer 23 and, in turn, the washer is held in position by a disk 24 which is secured in the recess in any well known manner.

The upper end of the tubular member is internally screw-threaded, as at 25, to receive a screw-threaded plug 26 which is provided on its upper end with a knurled head 27 and in its lower end with a bore or recess 28 having a conical bottom 29 which serves as a bearing for the point of the conical tip 14 of the rod.

The plug forms an adjustable bearing and by screwing it in or out of the tubular member 19 this member can be moved longitudinally of the rod and the bearing balls 22 brought into rolling contact with the tapered portion 12 of the rod, and thus hold the member 19 concentric with the rod at its lower end, the cone bearing at the upper end of the member serving for this purpose in addition to acting as a thrust bearing.

Secured at the top of the housing 20 is a plate 30 which surrounds the tubular member 19 and has certain of the bars 31 comprising the bottom of the basket 32.

The bars 31 are arranged in the form of a grating and have their outer ends attached to a ring 33. A plurality of vertically extending bars 34 are secured at one end to the ring 33 at equally spaced points of its circumference, and a ring 35 is secured to their upper ends. The bars 34 may be stiffened intermediate the rings 33 and 35 by one or more reinforcing rings 36, the number of these intermediate or reinforcing rings depending upon the height of the basket.

Projecting through the wall 3 and near the bottom 2 is a T having its arms 37 and 38 located inside the container while the arm 39 projects through the wall 3 and is arranged to receive a hose coupling.

The arm 37 of the T has one end of a pipe 40, which is parallel to the bottom 2, secured therein, the opposite end of the pipe being closed as by means of a plug 41. The pipe 40 is provided with a plurality of longitudinally spaced openings 43 which are so positioned that water issuing therefrom will be directed upwardly through the bottom of the basket.

The arm 38 of the T has one end of a pipe 42 secured therein. This pipe extends parallel to the wall 3, being held in position by the bands 44 and screws 45, which screws pass through the wall 3. The pipe 42 is also provided with longitudinally spaced openings 46 which are so arranged as to deliver water issuing therefrom through the side of the basket.

The upper end of the pipe 42 carries an L 47 in which one end of a pipe 48 is secured. The opposite end of the pipe is closed as indicated at 49. The pipe 48 extends parallel to the bottom 2 and is bent longitudinally on the arc of a circle having as its center the center of the container so that it can swing into the position shown by dotted lines in Fig. 2 to permit removal of the basket 32. This may be done by arranging the L so that it will turn on the pipe 42, or by arranging the pipe 42 to turn in the T. Either of these methods may be followed without departing from the spirit of my invention.

The pipe 48 is also provided with longitudinally spaced openings 50 which are so arranged as to direct water issuing therefrom into the top of the basket.

The openings in one or more of the pipes aforementioned are so arranged as to strike dishes in the basket at such an angle as to cause the basket to rotate or spin in the direction of the arrow in Fig. 2.

In order to control the speed of rotation of the basket I have devised a braking mechanism operable from without the container and while dishes are being washed, which consists of a fork or bracket 51 which is secured to the inner face of the wall 3. A lever 52 is pivotally carried intermediate its ends by this bracket. Pivotally secured to the lower end of the lever 52 is one end of a bar 53 having a wedge or braking surface 54 formed on its opposite end.

The upper end of the lever 52 is provided with a threaded opening to receive a screw 55 which extends through the wall 3 and has an operating head 56 on its outer end. Longitudinal movement of the screw 55 through the wall 3 is prevented in one direction by the head 56 and in the other direction by a collar 57 which is held on the screw in any convenient manner.

The wedge end 54 of the bar 53 is to be inserted underneath the housing 20 and frictionally contact the lower end thereof, the degree of friction being regulated by turning the head 56, thus swinging the bar 52 on its pivot, thereby moving the wedge back and forth which in turn will control the speed of rotation of the basket under the influence of the sprays from the pipes 40, 44 and 48. The wedge end 54 is so positioned that the tendency of the spin of the basket to move it laterally will cause it to contact the tapered portion 12 of the supporting rod.

The container is preferably provided with handles 58 although a bail may be substituted therefor, if desired.

The dishes are placed in the basket in any desired arrangement and the basket may either remain in the container or be removed therefrom for loading and unloading.

An important feature of my invention is the practically frictionless non-wabbling mounting of my basket on the supporting rod, together with the rotation control.

It will be noted that the basket in my device is suspended in the container from a cone bearing and is removable through the upper end of the container, eliminating the use of doors, gaskets etc. Its construction is simple so that there are no complicated parts to get out of order and require servicing by expert mechanics; all parts are easily accessible for cleaning purposes and its weight is negligible, all of which features render it particularly adaptable for family use.

What I claim and desire to secure by Letters Patent is:

In a device of the character described, a vertical bearing post having a cone shaped portion at its lower end, a tubular post sleeved over the bearing post, a bearing housing fixed to the lower end of the tubular post, an anti-friction bearing carried in the bearing housing and engaging said cone portion, and a bearing member adjustably threaded at the upper end of the tubular post and engaging the upper end of the vertical bearing post to rotatably suspend the tubular post for positioning the anti-friction bearing relatively to said cone portion to remove lateral play at the lower end of the tubular post whereby the tubular post is retained in perpendicular position when rotated about the bearing post.

GEORGE H. ARBENZ.